July 5, 1960 J. P. HANNA 2,943,908

APPARATUS FOR RECORDING AND PORTRAYING A VISIBLE MAGNETIC IMAGE

Filed Aug. 2, 1954

Inventor:
John P. Hanna,
by Merton D. Morse
His Attorney.

United States Patent Office 2,943,908
Patented July 5, 1960

2,943,908

APPARATUS FOR RECORDING AND PORTRAYING A VISIBLE MAGNETIC IMAGE

John P. Hanna, Schenectady, N.Y., assignor to General Electric Company, a corporation of New York Filed Aug. 2, 1954, Ser. No. 447,350

14 Claims. (Cl. 346—74)

This invention relates to a recording and portraying method and apparatus, and more particularly to an improved method and apparatus for developing or making visible a magnetic image formed of localized magnetic fields in a magnetic recording medium.

A process for magnetically recording, storing and printing information has recently been developed to avoid many of the disadvantages of former recording and printing methods. This process, which has become known as ferromagnetography, is described in detail in copending application Serial Number 223,423, filed April 27, 1951, by T. M. Berry, and assigned to the same assignee as the present invention. Basically, the process of magnetography comprises forming a magnetic image in the form of localized magnetic fields in a high retentivity magnetic material, the configuration of the invisible localized fields or flux patterns being a pictorial representation of the object or information desired ultimately to be transformed into visible or otherwise usable form. The magnetic image thus formed is developed or made visible by bringing minute magnetic particles into the magnetic attracting influence of the material containing the impressed magnetic image with the result that the particles adhere to the material in the form and outline of the image. The particles magnetically retained by the image may then be utilized to produce a printed record.

In many recording processes, it is desirable to utilize minute magnetic developing particles in a dry form to avoid the time delay and inconvenience inherent in a process where the developer powder is carried in a liquid medium. However, when a dry developer powder is used, difficulty may be experienced in that the dry particles often tend to adhere to unmagnetized areas of the magnetic recording medium because of mechanical adhesion, surface energy or other attracting influences. Therefore, a primary object of the present invention is to provide an improved method and apparatus for developing such a magnetic image, which utilize a dry developing powder and which provide means for moving unwanted or excess developing powder from the magnetic recording member.

In practice, it is quite difficult to remove adhering minute magnetic particles from unmagnetized areas of the magnetic recording medium without somewhat disarranging those particles adhering to the recording medium in the form of the recorded image. Therefore, another object of the invention is to provide a novel method and apparatus of the above type which includes a means for re-aligning with the fields of the impressed magnetic image those minute magnetic developing particles remaining on the recording medium after the excess particles have been removed.

The aforesaid objects are attained by utilizing the method of the invention, which comprises impressing a magnetic image on a high retentivity ferromagnetic material in the form of localized magnetic fields bringing dry minute magnetic particles into the attracting influence of the magnetic image to cause some of the particles to adhere to the ferromagnetic material in the form of the impressed magnetic image, wiping or brushing from the ferromagnetic member excess minute magnetic particles that may have adhered to the ferromagnetic member because of mechanical adhesion, surface energy, or other attracting influences, and re-aligning with the fields of the impressed magnetic image those particles remaining on the ferromagnetic member after the excess particles have been removed.

The novel features which I believe to be characteristic of my invention are set forth with particularity in the appended claims. My invention itself, however, both as to its organization and method of operation, together with further objects and advantages thereof, may best be understood by reference to the following description, taken in conjunction with the accompanying drawings, in which Fig. 1 is a perspective view of an apparatus constructed in accordance with the invention;

Figures 1, 2, 3:
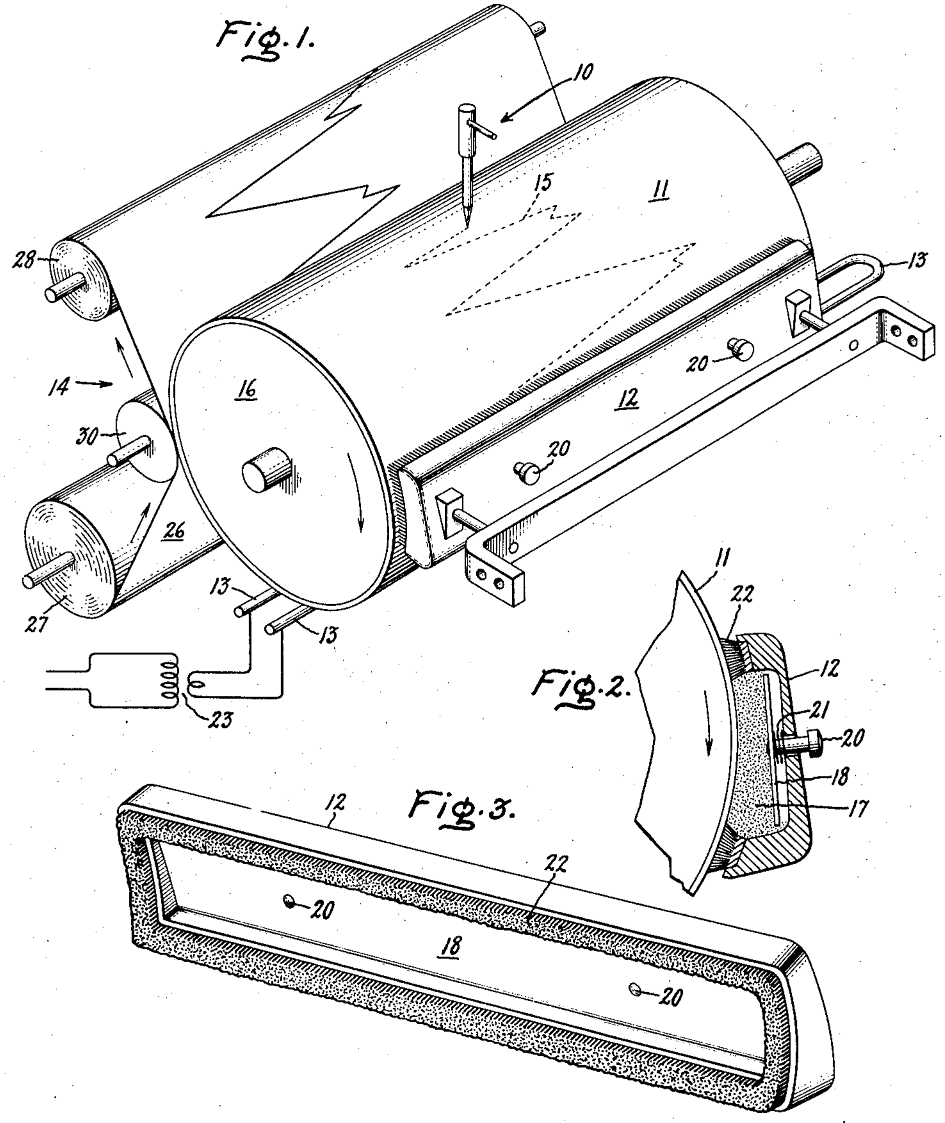
Fig. 2 is an enlarged sectional view showing the means for bringing the minute magnetic particles into contact with the ferromagnetic member.
Fig. 3 is a perspective view of the mechanism shown in Fig. 2, with the developing powder removed for the sake of clarity.

Referring now to Fig. 1, it is seen that the apparatus of the invention comprises, in general, recording means 10 for locally magnetizing a surface region of a high retentivity ferromagnetic cylinder 11, developing means that includes a developer tray 12 for bringing minute magnetic particles into contact with the surface of the ferromagnetic cylinder 11 to develop or make visible the magnetic image impressed thereon, a coil 13 for aligning the minute magnetic particles with the magnetic field of the impressed magnetic image, and a printing assembly 14 for printing the developed image.

The recording means 10 is shown diagrammatically as a magnetic stylus which is impressing a magnetic image 15, shown in dotted lines, on the surface of the ferromagnetic cylinder 11. It is to be understood, however, that various means may be employed to locally magnetize the surface area of the ferromagnetic cylinder 11, and this invention is not limited to the use of any particular means for recording. For examples of various recording methods, reference is made to the above-mentioned patent application of T. M. Berry.

The word "ferromagnetic" is used herein to define a substance whose magnetic permeability is considerably above that of air and varies at different values of flux density. Ferromagnetic materials have the marked magnetic effects exhibited, for example, by iron, nickel and cobalt. The expression "retentivity" herein employed defines the ability of a magnetic material to retain its magnetization once it is magnetized, and the "coercivity" is the magnetic force that must be applied in a reverse direction to a magnetized body to remove its residual magnetism. The present invention is in no way limited to the use of any particular material for the ferromagnetic cylinder 11, so long as the material has high retentivity and is capable of localized surface magnetization. However, it has been found that the alloys known as cunico (29% cobalt, 21% nickel and 50% copper) and cunife (60% copper, 20% nickel and 20% iron), as well as numerous other ferromagnetic materials, are well suited to this use.

Referring again to Fig. 1, it is seen that the high retentivity ferromagnetic cylinder 11 is supported on a drum 16, which is preferably constructed of a relatively high permeability, low coercivity, magnetic material such as soft iron or low carbon content steel. However, the materal of which the drum 16 is constructed is not of critical importance, and it need not necessarily possess magnetic properties. The drum 16 is supported for rotation on an axle and may be driven by a conventional motor and transmission assembly (not shown).

It is pointed out that the various parts of the equipment illustrated may be supported on a frame structure in a conventional manner. However, in order to show the invention most clearly, the supporting structure has been omitted from the drawing.

After the image has been recorded on the ferromagnetic cylinder 11 in the form of localized magnetic fields, it must be developed or made visible. In the present invention, this is accomplished by the developer assembly that includes the developer tray 12 spaced from the recording assembly in the direction of rotation of the ferromagnetic cylinder. Referring now to Fig. 2, it is seen that the developer tray 12 contains the developer powder in the form of minute magnetic particles 17. The principal requirement for the developer is that it be a finely divided magnetic powder, and it is preferably black in color. The invention is not limited to the use of any particular developer, although it has been found that synthetic magnetite ($Fe_3O_4$), composed of particles ranging upwardly in diameter from 0.5 micron, is suitable for such use.

It is pointed out that the ferromagnetic cylinder 11 may be magnetized in different degrees, and thus a gray scale effect provided; that is, the image produced by the recording apparatus is not necessarily black and white, but may include gradations lying between these two extremes, in accordance with the strength of the magnetic fields produced on the surface of the cylinder by the recording assembly. In order to obtain such gradations, an ample supply of developer must be provided to permit the maximum number of minute magnetic particles possible to adhere to those portions of the cylinder that have been magnetized to the maximum extent. Therefore, as seen in Fig. 2, the developer tray 12 is provided with a plate 18 to urge the minute magnetic particles 17 into contact with the surface of the ferromagnetic cylinder 11 as it rotates past the developer tray. The plate 18 is mounted on a pair of posts 20 that extend through the back of the tray 12 and are slidable therethrough, and a spring 21 mounted on each of the posts 20 between the back of the tray 12 and the plate 18 urges the plate toward the cylinder 11. Thus, the plate 18 acts to cause the maximum number of minute magnetic particles to contact the surface of the ferromagnetic cylinder 11 bearing the invisible magnetic image. In addition, agitating means (not shown) may be provided in the tray 12 to prevent the minute magnetic particles from packing together, if desired.

When the magnetic particles 17 are pressed into contact with the surface of the cylinder 11, some of the particles may adhere to the surface of the cylinder because of static electric charges or because of other attracting influences such as moisture or remanent magnetic fields remaining on the cylinder on portions other than those on which an image has been recorded. In order to remove those unwanted particles adhering to the cylinder, means are provided to wipe the surface of the cylinder. As best seen in Fig. 3, the edges of the tray 12 adjacent the surface of the cylinder 11 are covered with a brush-like material 22, which may be any one of several types. It has been found that satisfactory results may be obtained from a material having a relatively long nap, or from a pile fabric such as a rug or carpet, or, in some cases, from a bristle structure such as a brush. In any case, the pressure exerted against the surface of the ferromagnetic cylinder by the brush-like wiper must not be sufficient to dislodge those magnetic particles adhering to the cylinder in the form of the image. On the other hand, the pressure of the wiper must be sufficient to remove or brush off those magnetic particles adhering to unmagnetized areas of the cylinder.

In practice, the pressure exerted by the wiper material 22 cannot be adjusted to remove unwanted magnetic particles from the surface of the ferromagnetic cylinder without somewhat disarranging those particles adhering to the cylinder surface in the form of the magnetic image. Therefore, as seen in Fig. 1, an aligning coil 13 is provided for re-aligning the disarranged magnetic particles with the fields of the magnetic image recorded on the ferromagnetic cylinder. The aligning coil 13, which is considered to be part of the developer assembly, is spaced from the developer tray and wiper in the direction of rotation of the ferromagnetic cylinder 11, and comprises a single turn of heavy wire that extends substantially from one end of the cylinder 11 to the other. The coil 13 may be connected to the secondary winding of a transformer 23 whose primary winding is energized from a conventional alternating current source (not shown). Of course, the turn ratio of the transformer depends on the A.C. source and on the current that must flow through the single turn coil 13.

Figure 4:
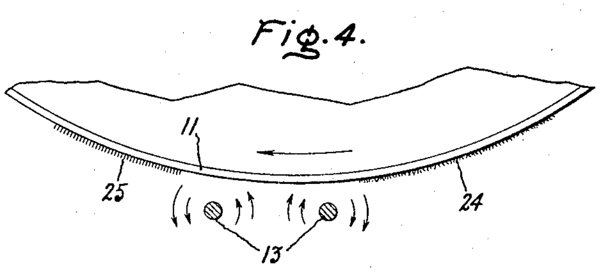
Fig. 4 is a sectional view, somewhat diagrammatic in form, showing the re-alignment of the magnetic particles with the fields of the impressed magnetic image after the excess particles are removed.

The theory of the action of magnetic particles subjected to an alternating magnetic field, such as that produced by the coil 13, is not completely understood at this time. However, it is believed that the action is somewhat as follows:

When the coil 13 is energized by an alternating current, at a given instant magnetic fields may be produced about the coil as shown by the arrows in Fig. 4. These fields, which have components that are both normal and tangential to the surface of the ferromagnetic cylinder 11, tend to cause the minute magnetic particles adhering to the ferromagnetic cylinder to orient themselves in a particular direction. This occurs because each of the minute magnetic particles acts as a magnet having a north and a south pole. An instant later, when the polarity of the fields about the coil 13 is reversed, the orientation of the minute magnetic particles tends to reverse, and thus the particles oscillate or even bounce and dance about, reorienting themselves at each reversal of the field about the coil 13. Whether or not the particles oscillate in this manner depends on the strength of the fields set up about the coil 13, and the frequency of the alternating current through the coil. If the field strength of the coil is slight, the strength of the magnetic fields on the ferromagnetic cylinder will keep the particles immobile; if the coil field strength is too great, the developing particles will be pulled from the ferromagnetic cylinder and the ferromagnetic cylinder may be demagnetized. Thus, the recorded image will be lost. Similarly, if the frequency of reversal of the fields about the coil is too high, the inertia of the magnetic particles may prevent them from oscillating, and they will be demagnetized. The particular values of coil field strength and frequency necessary to cause physical oscillation of the minute magnetic particles must be determined with regard to the characteristics of the particles and the coercivity of the material employed for the ferromagnetic cylinder 11. For example, using synthetic magnetite particles of 0.5–5.0 micron diameter and a ferromagnetic cylinder constructed of cunico (29% cobalt, 21% nickel, and 50% copper), which has a coercivity of approximately 400 oersteds, oscillatory motion of the magnetic particles is obtained when the wires of the single turn coil are separated by about $\frac{3}{16}$ of an inch, are .015–.020 inch from the surface of the ferromagnetic cylinder, and carry a current of 75 amperes at 400 cycles per second. These data are merely exemplary, however, and the proper values must be determined experimentally for various conditions.

Referring again to Fig. 4, the minute magnetic particles adhering to the cylinder 11 and approaching the coil 13 are shown diagrammatically at 24 as somewhat misaligned. As the cylinder rotates and the misaligned particles pass through the magnetic fields about the coil, the particles oscillate and dance about in the manner previously described. Then, as the particles pass out of the fields of the coil, the particles align themselves with the magnetic fields of the recorded image, as shown diagrammatically at 25. Thus, the definition of the developed image is markedly improved. It is pointed out that those particles adhering to the surface of the ferromagnetic cylinder in areas having a very weak magnetic field impressed thereon will be removed from the cylinder, and thus the contrast of the image is improved.

As best seen in Fig. 1, after the image has been developed, the cylinder 11 continues to rotate and the image approaches the printing assembly 14, where the image is transferred to a print receiving member. The invention is in no way limited to any particular method of printing, and several suitable methods are described in the copending patent application of T. M. Berry referred to previously. However, for purposes of illustration, the printing assembly 14 is shown as comprising a web of print receiving material 26, a supply roll 27, a take-up roll 28 and a transfer roller 30, for feeding the print receiving material in surface contact with a portion of the ferromagnetic cylinder bearing the developed image. The print receiving member 26 may comprise a paper web coated with a conventional adhesive material. Thus, when the material 26 is pressed into contact with the surface of the cylinder 11 by the transfer roller 30, the magnetic particles adhering to the surface of the cylinder in the form of the image are transferred to the surface of the print receiving material 26 to provide a permanent record. The movement of the print receiving material 26 is, of course, synchronized with the rotation of the ferromagnetic cylinder 11. If desired, the printing assembly may be eliminated entirely, and the developed image merely viewed on surface of the cylinder. However, in most applications, a permanent form of record will usually be desired.

An erase head (not shown) may be positioned adjacent the surface of the cylinder 11 between the printing assembly 14 and the recording means 10. The erasing head may be a conventional electromagnet that serves to demagnetize the surface of the cylinder 11 before another image is recorded thereon.

It is now apparent that the invention provides an improved method and apparatus for developing a magnetic image that attains the objectives set forth. Ample opportunity is provided for the greatest possible number of magnetic particles to adhere to those areas of the ferromagnetic cylinder that are magnetized to the greatest extent. Any particles adhering to unmagnetized areas are removed by the brush-like wiper material, and the remaining particles are re-aligned to provide a clean, clear-cut image. The only time delay in the system is the time required for the recorded image to move from the recording head to the printing assembly, and the ferromagnetic cylinder may be rotated at a relatively high rate of speed to reduce that time delay to a minimum.

While I have illustrated a particular embodiment of my invention, it will of course be understood that I do not wish to be limited thereto since various modifications both in method and apparatus may be made, and I contemplate by the appended claims to cover any such modifications as fall within the true spirit and scope of my invention.

What I claim as new and desire to secure by Letters Patent of the United States is:

1. Magnetic recording and portraying apparatus comprising a ferromagnetic member, means for impressing a magnetic image on said ferromagnetic member, means for subjecting minute magnetic particles to the attracting influence of said magnetic image whereby some of said particles adhere to said ferromagnetic member in the form of said impressed magnetic image, means for removing excess magnetic particles from said ferromagnetic member, and means for aligning with the field of said impressed magnetic image those minute magnetic particles remaining on said ferromagnetic member which have become misaligned with respect to said field by said removing means.

2. Magnetic recording and portraying apparatus comprising a movable ferromagnetic member, means for impressing a magnetic image on said ferromagnetic member, means spaced from said image impressing means in the direction of movement of said ferromagnetic member for subjecting minute magnetic particles to the attracting influence of said magnetic image whereby some of said particles adhere to said ferromagnetic member in the form of said impressed magnetic image, means for removing excess magnetic particles from said ferromagnetic member, and means spaced from said excess particle removing means in the direction of movement of said ferromagnetic member for aligning with the magnetic fields of said impressed magnetic image particles remaining on said ferromagnetic member.

3. Magnetic recording and portraying apparatus comprising a movable ferromagnetic member, means for impressing a magnetic image on said ferromagnetic member, means spaced from said image impressing means in the direction of movement of said ferromagnetic member for subjecting minute magnetic particles to the attracting influence of said magnetic image whereby some of said particles adhere to said ferromagnetic member in the form of said impressed magnetic image, a brush-like wiper in contact with said ferromagnetic member for removing excess magnetic particles from said ferromagnetic member, and means spaced from said wiper in the direction of movement of said ferromagnetic member for aligning with the magnetic fields of said impressed image particles remaining on said ferromagnetic member.

4. Magnetic recording and portraying apparatus comprising a movable ferromagnetic member, means for impressing a magnetic image on said ferromagnetic member, means spaced from said image impressing means in the direction of movement of said ferromagnetic member for subjecting minute magnetic particles to the attracting influence of said magnetic image whereby some of said particles adhere to said ferromagnetic member in the form of said impressed magnetic image, means for removing excess magnetic particles from said ferromagnetic member, and means spaced from said excess particle removing means in the direction of movement of said ferromagnetic member for causing minute magnetic particles remaining on said ferromagnetic member to change position to align themselves with the magnetic fields of said impressed image.

5. Magnetic recording and portraying apparatus comprising a movable ferromagnetic member, means for impressing a magnetic image on said ferromagnetic member, means spaced from said image impressing means in the direction of movement of said ferromagnetic member for subjecting minute magnetic particles to the attracting influence of said magnetic image whereby some of said particles adhere to said ferromagnetic member in the form of said impressed magnetic image, a brush-like wiper in contact with said ferromagnetic member for removing excess magnetic particles from said ferromagnetic member, and means spaced from said wiper in the direction of movement of said ferromagnetic member for causing minute magnetic particles remaining on said ferromagnetic member to change position to align themselves with the magnetic fields of said impressed image.

6. Magnetic recording and portraying apparatus comprising a movable ferromagnetic member, means for impressing a magnetic image on said ferromagnetic member, means spaced from said image impressing means in the direction of movement of said ferromagnetic member for subjecting minute magnetic particles to the attracting influence of said magnetic image whereby some of said particles adhere to said ferromagnetic member in the form of said impressed magnetic image, means spaced from said last-mentioned means in the direction of movement of said ferromagnetic member for removing excess magnetic particles from said ferromagnetic member, and electric coil means spaced from said excess particle removing means in the direction of movement of said ferromagnetic member for subjecting the minute magnetic particles remaining on said ferromagnetic member to oscillatory forces to enable said particles to align themselves with the magnetic fields of said impressed image.

7. Magnetic recording and portraying apparatus comprising a rotatable ferromagnetic cylinder, means for impressing a magnetic image on the surface of said ferromagnetic cylinder, a tray adjacent the surface of said cylinder and spaced from said image impressing means in the direction of rotation of said cylinder, minute magnetic particles contained in said tray, means in said tray for urging said magnetic particles into contact with the surface of said ferromagnetic cylinder whereby some of said particles adhere to said surface in the form of said impressed magnetic image, a brush-like wiper mounted on said tray and in contact with the surface of said ferromagnetic cylinder for removing excess magnetic particles from said surface, and electric coil means spaced from said wiper in the direction of movement of said ferromagnetic member for subjecting the minute magnetic particles remaining on said ferromagnetic member to oscillatory forces to enable said particles to align themselves with the magnetic fields of said impressed image.

8. Apparatus for developing a magnetic image impressed upon a ferromagnetic member comprising means for subjecting minute magnetic particles to the attracting influence of said magnetic image whereby some of said particles adhere to said ferromagnetic member in the form of said impressed magnetic image, means for removing excess magnetic particles from said ferromagnetic member, and means for aligning with the field of said impressed magnetic image minute magnetic particles remaining on said ferromagnetic member.

9. Apparatus for developing a magnetic image impressed upon a movable ferromagnetic member comprising means for subjecting minute magnetic particles to the attracting influence of said magnetic image whereby some of said particles adhere to said ferromagnetic member in the form of said impressed magnetic image, means for removing excess magnetic particles from said ferromagnetic member, and means spaced from said excess particle removing means in the direction of movement of said ferromagnetic member for causing minute magnetic particles remaining on said ferromagnetic member to change position to align themselves with the magnetic fields of said impressed image.

10. Apparatus for developing a magnetic image impressed on the surface of a rotatable ferromagnetic cylinder comprising a tray adjacent the surface of said cylinder, minute magnetic particles contained in said tray, means in said tray for urging said magnetic particles into contact with the surface of said ferromagnetic cylinder whereby some of said particles adhere to said surface in the form of said impressed magnetic image, a brush-like wiper mounted on said tray and in contact with the surface of said ferromagnetic cylinder for removing excess magnetic particles from said surface, and electric coil means spaced from said wiper in the direction of movement of said ferromagnetic member for subjecting the minute magnetic particles remaining on said ferromagnetic member to oscillatory forces to enable said particles to align themselves with the magnetic fields of said impressed image.

11. Magnetic recording and portraying apparatus comprising a movable ferromagnetic member, means for impressing a magnetic image on said ferromagnetic member, developing means spaced from said image impressing means in the direction of movement of said ferromagnetic member for subjecting minute magnetic particles to the attracting influence of said magnetic image whereby some of said particles adhere to said ferromagnetic member in the form of said impressed magnetic image, means spaced from said developing means in the direction of movement of said ferromagnetic member for removing excess magnetic particles from said ferromagnetic member, and means spaced from said excess particle removing means in the direction of movement of said ferromagnetic member for aligning with the magnetic fields of said impressed magnetic image the particles remaining on said ferromagnetic member.

12. Apparatus for developing a magnetic image impressed upon a magnetic member comprising means for subjecting minute magnetic particles to the attracting influence of said magnetic image whereby some of said particles adhere to said magnetic member in the form of said impressed magnetic image, and means for immersing said particles in an oscillatory magnetic field for aligning them with the field of said impressed magnetic image.

13. Apparatus for developing a magnetic image impressed upon a magnetic member comprising means for subjecting minute magnetic particles to the attracting influence of said magnetic image whereby some of said particles adhere to said magnetic member in the form of said impressed magnetic image, and electric coil means for subjecting said particles to oscillatory forces to enable said particles to align themselves with the magnetic fields of said impressed image.

14. Magnetic recording and portraying apparatus comprising a ferromagnetic member, means for impressing a magnetic image on said ferromagnetic member, means located adjacent to said ferromagnetic member for subjecting minute magnetic particles to the attracting influence of said magnetic image whereby some of said particles adhere to said impressed magnetic image, and means for subjecting those minute magnetic particles adhering to said magnetic image to an oscillatory magnetic field for aligning said particles with the magnetic fields of said impressed magnetic image.

References Cited in the file of this patent

UNITED STATES PATENTS

| | | |
|---|---|---|
| 2,573,881 | Walkup et al. | Nov. 6, 1951 |
| 2,657,932 | Blaney | Nov. 3, 1953 |
| 2,732,775 | Young | Jan. 31, 1956 |
| 2,786,439 | Young | Mar. 26, 1957 |

FOREIGN PATENTS

| | | |
|---|---|---|
| 733,484 | Great Britain | July 13, 1955 |

OTHER REFERENCES

Journal of the Franklin Institute, November 1951, pp. 373–381.